United States Patent [19]
Ryder

[11] 3,814,158
[45] June 4, 1974

[54] RUN FLAT DEVICE FOR TIRES

[75] Inventor: John Charles Ryder, Doylestown, Ohio

[73] Assignee: The Firestone Tire & Rubber Company, Akron, Ohio

[22] Filed: Apr. 3, 1970

[21] Appl. No.: 25,476

[52] U.S. Cl. .............................................. 152/158
[51] Int. Cl. ............................................ B60c 17/04
[58] Field of Search .................................. 152/158

[56] References Cited
UNITED STATES PATENTS

| | | | |
|---|---|---|---|
| 3,208,500 | 9/1965 | Knipp et al. | 152/330 X |
| 3,251,391 | 5/1966 | Johnson | 152/158 |
| 3,367,381 | 2/1968 | Aghnides | 152/158 |
| 3,509,928 | 5/1970 | Aghnides | 152/158 |

Primary Examiner—M. Henson Wood, Jr.
Assistant Examiner—George H. Libman
Attorney, Agent, or Firm—S. M. Clark

[57] ABSTRACT

A one piece annular non-pneumatic run flat device for use with a pneumatic tire and a one piece rim. The run flat device has bead engaging surfaces which engage the beads of the tire which beads in turn engage respective flanges on the rim. The inner diameter of the run flat device is about equal to or greater than the outside diameter of the rim and in use, the run flat device is spaced from the rim. An outer annular surface on the run flat device is spaced from the crown of the tire in the inflated condition thereof; however, upon deflation of the tire the crown engages the outer annular surface of the run flat device and is supported by way of the bead engaging surfaces, tire beads and rim. The cross section of the run flat device is preferably designed to bend toward the rim centerline in mounting of the tire and the preferred material of construction of the run flat device is a polyurethane material.

7 Claims, 4 Drawing Figures

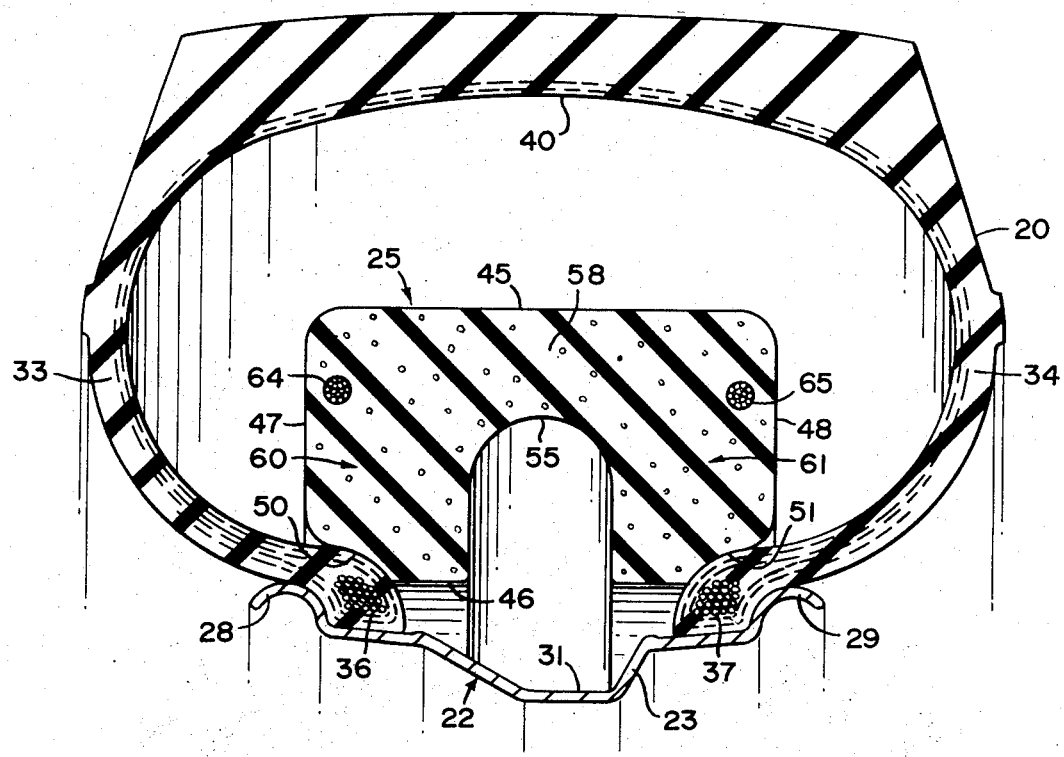

RUN FLAT DEVICE FOR TIRES

The prior art includes many devices, referred to hereinafter as run flat devices, for cooperative use with conventional pneumatic tires and wheels so as to enable the vehicle to be driven when the tire becomes deflated without damaging the tire beyond repair. It is normally desired that the device be capable of enabling the vehicle to be driven at a reasonable speed at a reasonable distance until the tire can be repaired. It is desirable to provide a run flat device which is non-pneumatic in nature, is a continuous one piece ring like member and can be utilized with a one piece wheel or rim.

Prior art devices which can be generally classified as pneumatic, have not been very well accepted in the market place because they are quite difficult to mount and the air valves necessary to inflate them are quite complicated. Solid run flat devices usually have to be made in several pieces which in turn requires fasteners to hold the various pieces together or to the wheel. Generally the fastening devices must be engaged inside the tire which is a difficult and slow procedure and the fasteners introduce potential failure points in the run flat device. The reason these devices must be multi-piece or in other words segmented, is to allow them to clear the flanges of the rim and to bear upon the rim portion between the two tire beads. Any of the prior art which were one piece run flat devices, had to be mounted with a split wheel so as to properly place the device in position.

The present invention has as its principal object the providing of a run flat device that is non-pneumatic, a one piece continuous construction which is mountable on a one piece drop center wheel and which is compatible with the tire in all phases of its normal operation. The run flat device must be capable of supporting the weight of the car if the tire loses air for one reason or another. In the un-inflated condition of the tire, the load of the car is transmitted through the tire's crown, through two shoulders of the run flat device to the tire beads and thereafter to the rim of the wheel. The run flat device of the present invention is designed so that it will bend appropriately upon mounting of the tire upon the wheel and yet resist compression under load so as to support the weight of the vehicle when the tire is flat.

Other objects and a fuller understanding of this invention may be had by referring to the following description and claims, taken in conjunction with the accompanying drawings, in which:

FIG. 1 is a sectional view showing the run flat device of the present invention in cooperation with a one piece drop center wheel and in combination with a fully inflated pneumatic tire;

FIG. 2 is a view similar to FIG. 1 but showing the tire in a deflated condition;

Figure 3:
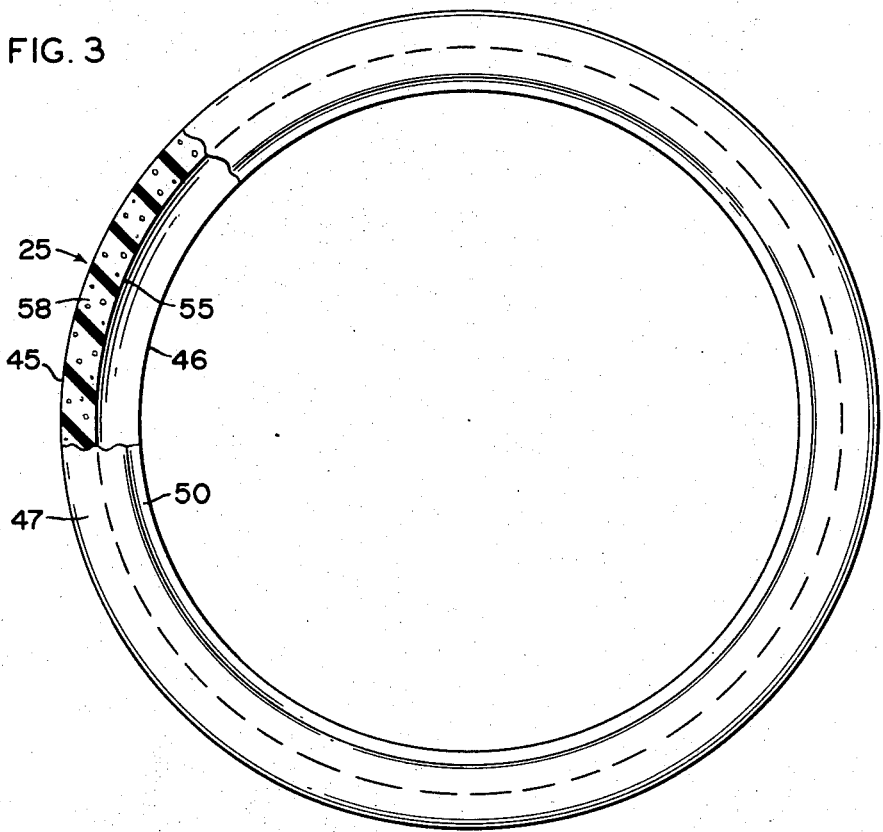
FIG. 3 is a reduced elevational view of the run flat device of FIGS. 1 and 2 separated from the tire and wheel; and, FIG. 4 is an isometric cross sectional view of a modified form of the run flat device of the present invention.

Referring specifically to FIGS. 1, 2 and 3 which illustrate a preferred embodiment of the invention, it will be noted that there is shown a pneumatic tire 20, a wheel 22, including a rim 23 and the run flat device of the present invention hereinafter somtimes referred to as an annular safety member 25.

The rim 23 includes first and second axially spaced and annularly extending bead engaging walls or flanges 28 and 29, respectively and a drop center which is defined by a radially inwardly recessed wall 31 provided between the bead engaging walls 28 and 29. The wheel 22 is commonly referred to in the art as a one piece drop center wheel.

The tire 20 is provided with first and second side walls 33 and 34 respectively which are connected to first and second axially spaced and annularly extending beads 36 and 37, respectively, which beads in turn are in engagement with walls 28 and 29 of the rim. The other ends of the side walls are respectively connected to a crown portion 40 of the tire and this serves to form an enclosure to hold air under pressure through a conventional valving mechanism (not shown) well-known to those skilled in the art.

The annular safety member 25 is located within the enclosure defined by the tire and the rim and as will be noted particularly from FIGS. 1, 2 and 3, comprises a substantially solid one piece ring like member which has an inside diameter about equal to or slightly larger than the outside diameter of the bead engaging walls 28 and 29.

In cross section the annular safety member 25 comprises an outer wall 45, an inner wall 46 and first and second side walls 47 and 48 respectively. As will be noted, the first and second side walls 47 and 48 are preferably spaced apart a distance which is on the order of the distance between the rim flanges 28 and 29 or slightly larger. They are also respectively spaced from the first and second side walls of the tire. The outer wall 45 is spaced from the crown portion 40 of the tire in its inflated condition and FIG. 2 illustrates how the two are engaged in the deflated condition of the tire. Wall means are provided on the safety member 25 which define first and second annularly extending bead engaging surfaces 50 and 51, respectively, which are located in the areas between the first side wall 47 and the inner wall 46 in the first instance and between the second side wall 48 and the inner wall 46 in the second instance. The first and second bead engaging surfaces 50, 51 engage respectively the first and second beads 36 and 37 of the tire. Wall means define an arched and recessed surface 55 which extends from the inner wall 46 into the safety member and toward the outer wall 45 and as noted, terminates short of the outer wall to define a resiliently bendable section generally identified by the reference number 58. This configuration forms on the annular safety member what are generally referred to as first and second shoulders 60 and 61. The inner wall 46 of the safety member is spaced from the rim 23 and as will be noted in the inflated condition of the tire the safety member engages the tire only at the beads 36 and 37 by way of the first and second bead engaging surfaces 50 and 51 and of course in the deflated condition of the tire the crown engages the outer wall 45. First and second annularly extending supporting members in the form of bead wires 64 and 65, respectively, are embedded in the safety member on opposed sides of the arched and recessed surface 55. The bead wires are used to prevent "throw out" of the device at speeds above about 60 mph.

The material of construction of the annular safety member 25 is preferably but not necessarily a foamed polyurethane, which comprises polypropylene oxide based polyols containing MOCA and toluene diisocyanate. One important property of the material of construction, besides a degree of flexibility, is that it must go through rapid flex (compression) cycles without generating enough internal heat to melt or degrade. Each time a section of the device passes through the footprint (about 9 times per second at 40 MPH) it is compressed and the internal energy loss of this compression in the form of heat will destroy the device if the material is not efficient.

The run flat device is initially placed in the tire by distorting the same slightly and the device resumes its shape because of its inherent resilience and flexibility. The tire with the run flat device contained within the confines thereof is assembled upon the rim in essentially a conventional manner and the inside diameter of the run flat device being about equal to or larger than the outside diameter of the rim flanges enables the run flat device to pass over the one piece wheel. The resiliently bendable section 58 permits the run flat device to bend to allow the second bead engaging surface 51 (resting on the second bead 37) to move laterally toward the wheel center, thus allowing the tire's second bead to slide into the rim's drop center 31.

As assembled and in the inflated condition of the tire, the run flat device occupies the position shown in FIG. 1. In the deflated condition of the tire shown in FIG. 2, the weight of the vehicle is taken through the crown of the tire, through the first and second shoulders 60 and 61 to the beads of the tire and then to the rim. The design of the shoulders 60 and 61 is so related to the material of construction that these shoulders are thick enough in the radial direction to prevent the tire from falling more than a predetermined distance from inflated to flat condition. This predetermined distance is unique for each tire size. If the tire were to fall a greater distance from inflated to flat, the tire would itself fail from heat build-up due to overflexing of its sidewall rubber. This particular design is sufficient to run the vehicle at reasonable speeds, say on the order of 40 miles per hour, deflated, and for a reasonable distance, say on the order of 50 miles, to enable the tire to be repaired and then to again function in its normal inflated and intended condition.

When the tire is deflated it will be appreciated that the crown diameter engaging wall 45 is reduced while maintaining essentially the same circumferential extent as in the inflated condition. Because of this, there is much sliding movement between 40 and 45 which must be compensated for by a lubricant. In this regard it has been found satisfactory to introduce on the order of two ounces of a silicone lubricant into the tire cavity which overcomes the friction between surface 45 and the crown 40 of the tire. It is also possible to coat the run flat device or at least surface 45 with a permanent material which has a low coefficient of friction. It is also necessary to rotationally balance the run flat device and this is usually accomplished by drilling holes in the device to remove material and it is possible if desired, to add material.

Figure 4:
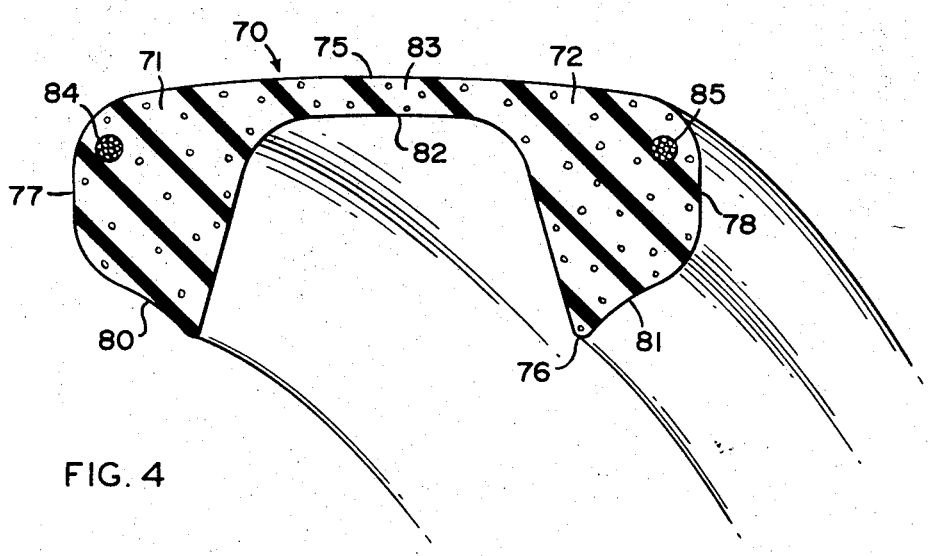

FIG. 4 is a modified form of the run flat device of the present invention and in this particular view has been identified by the reference numeral 70. This device also comprises a one piece ring like member 72 which has an outer wall 75, an inner wall 76 and first and second side walls 77 and 78, respectively. First and second bead engaging surfaces 80 and 81 respectively are formed on the member 72 for engagement with the beads and wall means 82 form an arched and recessed surface quite similar to surface 55 in FIGS. 1 and 2 which in turn defines a resiliently bendable section 83. Bead wires 84 and 85 are also embedded in this run flat device. This particular embodiment is shown to illustrate how the shape of the run flat device may vary within limits to accomplish its normal and intended results. In this particular run flat device 70, the inside diameter of the device is also designed to be about equal to or larger than the outside diameter of the rim flanges of the wheel with which it is to cooperate. In other respects, this device functions in the same manner as the device shown in FIGS. 1-3.

As a result it will be seen that the objects of the present invention are conveniently accomplished by the hereinabove disclosed teachings in that the run flat device is one piece and can be used on what is referred to in the art as a one piece drop center wheel. The device is easy to mount and has no mechanical fasteners as is the case with segmented devices. The one piece construction is inexpensive to produce and the light weight prevents balance and vehicle suspension problems.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In combination, a pneumatic tire, a wheel including a rim for said tire, and an annular safety member cooperating with said tire and said rim, said rim comprising first and second axially spaced and annularly extending bead engaging walls and a radially inwardly recessed wall therebetween, said tire comprising first and second axially spaced and annularly extending beads in engagement with said first and second bead engaging walls, respectively, said tire having first and second sidewalls extending from said first and second beads, respectively, and connecting with a crown portion to form an enclosure to hold air under pressure, said annular safety member comprising a substantially solid one piece member of resiliently flexible material residing within said enclosure and having an inside diameter about equal to or larger than the outside diameter of said bead engaging walls of said rim, said safety member in cross section comprising an outer wall, an inner wall, and first and second sidewalls, said first and second sidewalls being spaced apart a distance on the order of the distance between said first and second bead engaging walls and less than the width of said rim and respectively spaced from said first and second sidewalls of said tire, said outer wall being spaced from said crown portion in the inflated condition of the tire and supporting said crown portion in the deflated condition of the tire, wall means on said safety member defining first and second annularly extending bead engaging surfaces in the areas between the first and second sidewalls respectively and said inner wall, said first and second bead engaging surfaces engaging respectively said first and second beads, wall means defining an arched recessed surface extending from said inner wall into said safety member toward said outer wall and terminating short of said outer wall to define a resiliently bendable section, said inner wall of said safety member being spaced from said rim and in the inflated condition of the tire said safety member engaging said tire only at the beads by way of said first and second bead engaging surfaces, and first and second annularly extending supporting members embedded in said safety member on opposed sides of said annular safety member.

2. In combination a pneumatic tire having first and second sidewalls, a rim and a one piece safety device, said rim having first and second spaced flanges of a given outside diameter, said tire mounted on said rim and having first and second beads in engagement respectively with said first and second spaced flanges, said safety device comprising a one piece continuous annular member having an inside diameter about equal to or larger than said outside diameter of said flanges and contained within the confines of said tire, said continuous annular member having an axial width which is less than the axial width between the outer edges of said first and second spaced flanges, said safety device having first and second bead engaging surfaces in engagement with said first and second beads respectively and said safety device being spaced from said rim and from said first and second sidewalls of said tire.

3. The combination claimed in claim 2, wherein said rim is a one piece rim.

4. The combination claimed in claim 2, wherein the one piece safety device is constructed of a resilient and flexible material.

5. The combination claimed in claim 4, wherein the rim is a one piece drop center rim and first and second annular reinforcing members are embedded in the one piece safety device.

6. The combination claims in claim 4, wherein said material is polyurethane.

7. The combination claimed in claim 2, wherein said continuous annular member has first and second axially spaced sidewalls, which axially spaced sidewalls are spaced apart a distance on the order of the distance between said first and second spaced flanges or slightly larger than the distance between said first and second spaced flanges.

* * * * *